United States Patent
Song et al.

(10) Patent No.: US 12,212,851 B2
(45) Date of Patent: Jan. 28, 2025

(54) METHOD, COMPUTER PROGRAM, AND APPARATUS FOR CONTROLLING IMAGE ACQUISITION DEVICE

(71) Applicant: HANWHA AEROSPACE CO., LTD., Changwon-si (KR)

(72) Inventors: Jin Mo Song, Changwon-si (KR); Jong Min Lee, Changwon-si (KR); Hee Hak Yun, Changwon-si (KR); Young Jin Seo, Changwon-si (KR); Chang Seoun Cho, Changwon-si (KR)

(73) Assignee: HANWHA AEROSPACE CO., LTD., Changwon-Si (KR)

( * ) Notice: Subject to any disclaimer, the term of this patent is extended or adjusted under 35 U.S.C. 154(b) by 560 days.

(21) Appl. No.: 17/540,924

(22) Filed: Dec. 2, 2021

(65) Prior Publication Data
US 2023/0045988 A1   Feb. 16, 2023

(30) Foreign Application Priority Data
Aug. 12, 2021  (KR) .......................... 10-2021-0106952

(51) Int. Cl.
| | |
|---|---|
| *H04N 23/695* | (2023.01) |
| *F41G 3/02* | (2006.01) |
| *G06T 7/20* | (2017.01) |
| *G06V 10/82* | (2022.01) |
| *H04N 23/61* | (2023.01) |

(52) U.S. Cl.
CPC ............. *H04N 23/695* (2023.01); *F41G 3/02* (2013.01); *G06T 7/20* (2013.01); *G06V 10/82* (2022.01); *H04N 23/61* (2023.01)

(58) Field of Classification Search
CPC .......... G06T 7/20; G06V 10/82; G06V 10/25; G06V 10/62; H04N 23/61; H04N 23/617
See application file for complete search history.

(56) References Cited

U.S. PATENT DOCUMENTS

| | | | | |
|---|---|---|---|---|
| 2006/0291693 A1* | 12/2006 | Olson | ................ | G06V 10/7515 382/103 |
| 2014/0028856 A1* | 1/2014 | Ehrlich | ..................... | F41G 3/08 348/169 |

FOREIGN PATENT DOCUMENTS

| | | |
|---|---|---|
| KR | 10-1288388 B1 | 7/2013 |
| KR | 10-1811717 B1 | 1/2018 |
| KR | 10-2018-0069312 A | 6/2018 |
| KR | 10-2077597 B1 | 2/2020 |
| KR | 10-2119659 B1 | 6/2020 |

* cited by examiner

*Primary Examiner* — Christle I Marshall
(74) *Attorney, Agent, or Firm* — Sughrue Mion, PLLC

(57) ABSTRACT

A method of controlling an image acquisition device for tracking a target object includes: detecting an event in which tracking of a first object, which is a tracking target object, fails in a first image acquired by the image acquisition device; determining, in the first image, a reference object which is used as a reference for controlling the image acquisition device; controlling the image acquisition device such that at least one of an image capturing range and an image capturing direction of the image acquisition device is adjusted based on at least one of a size and a location of the reference object in the first image; and recognizing the first object in a second image acquired by the image acquisition device in a state in which at least one of the image capturing range and the image capturing direction is adjusted.

20 Claims, 10 Drawing Sheets

METHOD, COMPUTER PROGRAM, AND APPARATUS FOR CONTROLLING IMAGE ACQUISITION DEVICE

CROSS-REFERENCE TO RELATED APPLICATION

This application is based on and claims priority from Korean Patent Application No. 10-2021-0106952, filed on Aug. 12, 2021, in the Korean Intellectual Property Office, the disclosure of which is incorporated by reference herein in its entirety.

BACKGROUND

1. Field

Methods and apparatuses consistent with one or more embodiments of the disclosure relate to controlling an image acquisition device for tracking a target object.

2. Description of the Related Art

According to the development of computer technology, research into various devices for performing simple and repetitive human tasks has been recently conducted.

One of the most important factors in replacing human's work is to replace human visual perception. As one example, when monitoring a target or a target object by using an image acquired by an image acquisition device is performed by a computer, a function of recognizing and tracking a specific target or object in the image is required to be implemented.

The technique for recognizing and tracking an object in an image is generally performed by classifying individual frames constituting an image into an object region and a background region and tracking the location of the object region in a time-series manner.

However, the above technique has a problem in that tracking stops when the object is obscured by another object or when the object is temporarily not recognized in the image and is out of the image capturing range of the image acquisition device.

SUMMARY

One or more embodiments include a method of appropriately controlling an image acquisition device when tracking a target object fails and enabling tracking the target object again.

Various aspects of the embodiments will be set forth in part in the description which follows and, in part, will be apparent from the description, or may be learned by practice of the presented embodiments of the disclosure.

According to one or more embodiments, there is provided a method of controlling an image acquisition device for tracking a target object which may include: detecting an event in which tracking of a first object, which is a tracking target object, fails in a first image acquired by the image acquisition device; determining, in the first image, a reference object which is used as a reference for controlling the image acquisition device; controlling the image acquisition device such that at least one of an image capturing range and an image capturing direction of the image acquisition device is adjusted based on at least one of a size and a location of the reference object in the first image; and recognizing the first object in a second image acquired by the image acquisition device in a state in which at least one of the image capturing range and the image capturing direction is adjusted.

The determining the reference object may include setting a second object as the reference object when at least a portion of the first object is obscured by the second object, which is different from the first object, in the first image.

The determining the reference object may include: determining a moving direction of the first image based on at least one image acquired by the image acquisition device earlier than the first image; and determining, as the reference object, an object positioned in the determined moving direction in the first image.

The controlling the image acquisition device may include: determining a region corresponding to the reference object in the first image; and adjusting at least one of the image capturing range and the image capturing direction of the image acquisition device based on a relative locational relationship between the region corresponding to the reference object and a boundary line of the first image.

The controlling the image acquisition device may include, when the region corresponding to the reference object abuts the boundary line of the first image, adjusting the image capturing range and the image capturing direction of the image acquisition device such that the image capturing range of the image acquisition device is extended and the reference object is positioned in a center portion of the second image.

The controlling the image acquisition device may include, when the region corresponding to the reference object does not abut on the boundary line of the first image, adjusting the image capturing direction such that the reference object is positioned in a center portion of the second image.

The controlling the image acquisition device may include adjusting the image capturing range of the image acquisition device such that a ratio of the region corresponding to the reference object in the second image exceeds a certain first threshold ratio and is less than a certain second threshold ratio.

The recognizing the first object in the second image may include: maintaining the image capturing range and the image capturing direction of the image acquisition device until the first object is recognized in the second image; setting at least a partial region of the second image as a region of interest in which the first object is expected to appear; and recognizing the first object in the region of interest by using a trained artificial neural network.

The method may further include, after the recognizing the first object in the second image, initiating tracking of the first object by referring to a location of the first object in the second image.

According to one or more embodiments, there is provided a control apparatus for controlling an image acquisition device for tracking a target object. The control apparatus may include at least one processor configured to: detect an event in which tracking of a first object, which is a tracking target object, fails in a first image acquired by the image acquisition device; determine, in the first image, a reference object which is used as a reference for controlling the image acquisition device; control the image acquisition device such that at least one of an image capturing range and an image capturing direction of the image acquisition device is adjusted based on at least one of a size and location of the reference object in the first image; and recognize the first object in a second image acquired by the image acquisition device in a state in which at least one of the image capturing range and the image capturing direction is adjusted.

The processor may be further configured to set a second object as the reference object when at least a portion of the first object is obscured by the second object which is different from the first object, in the first image.

The processor may be further configured to determine a moving direction of the first image based on at least one image acquired by the image acquisition device earlier than the first image; and determine, as the reference object, any one of objects positioned in the determined moving direction in the first image.

The processor may be further configured to determine a region corresponding to the reference object in the first image; and adjust at least one of the image capturing range and the image capturing direction of the image acquisition device based on a relative locational relationship between the region corresponding to the reference object and a boundary line of the first image.

When the region corresponding to the reference object abuts the boundary line of the first image, the processor may be further configured to adjust the image capturing range and the image capturing direction of the image acquisition device such that the image capturing range of the image acquisition device is extended and the reference object is positioned in a center portion of the second image.

When the region corresponding to the reference object does not abut the boundary line of the first image, the processor may be further configured to adjust the image capturing direction such that the reference object is positioned in a center portion of the second image.

The processor may be further configured to adjust the image capturing range of the image capturing device such that a ratio of the region corresponding to the reference object in the second image exceeds a certain first threshold ratio and is less than a certain second threshold ratio.

The processor may be further configured to maintain the image capturing range and the image capturing direction of the image acquisition device until the first object is recognized in the second image; set at least a partial region of the second image as a region of interest in which the first object is expected to appear; and recognize the first object in the region of interest by using a trained artificial neural network.

The processor may be further configured to initiate tracking of the first object by referring to a location of the first object in the second image.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
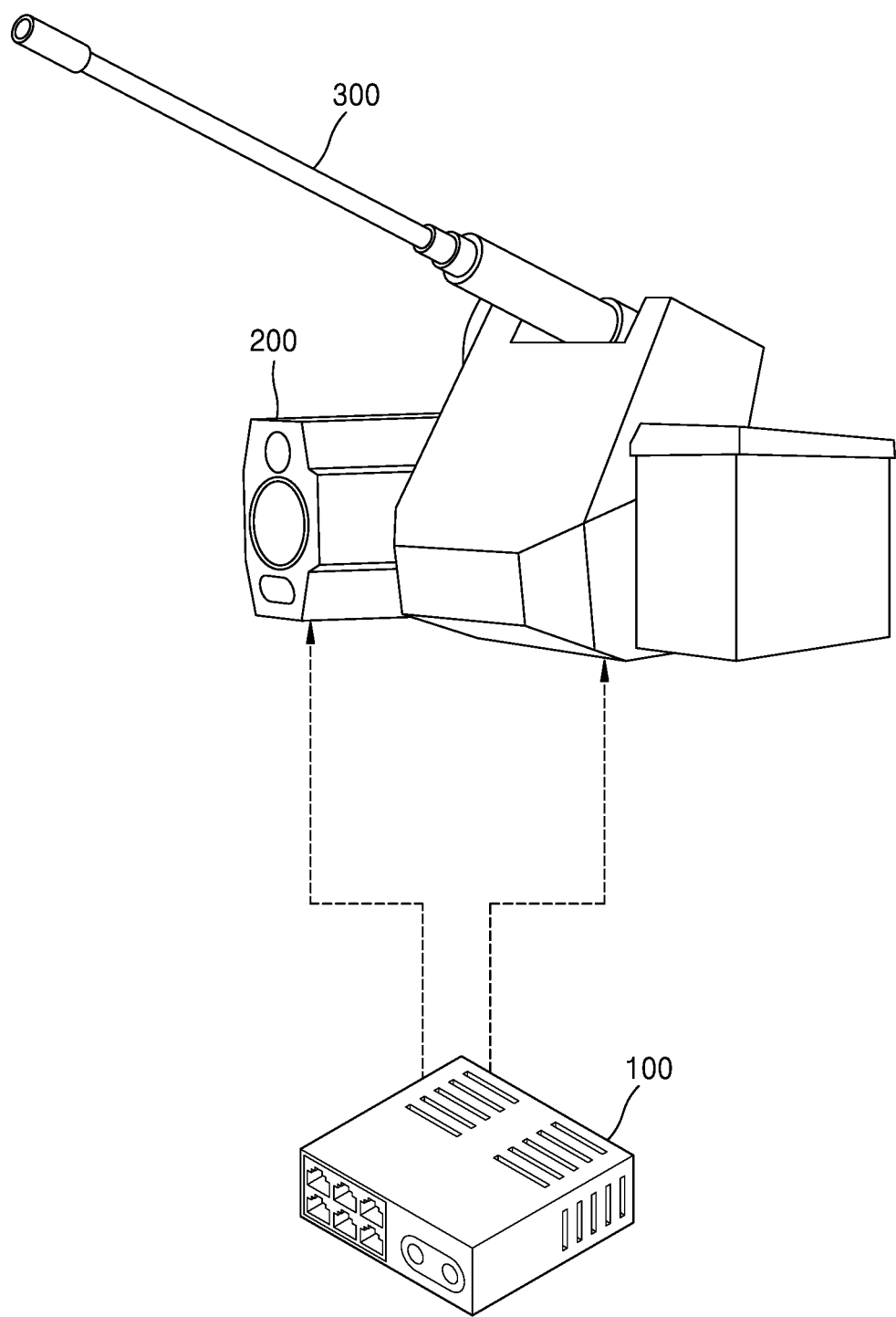
FIG. 1 is a schematic structural diagram of an weapon system, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the present disclosure allows for various changes and numerous embodiments, particular embodiments will be illustrated in the drawings and described in detail in the written description. Advantages, features, and a method of achieving the same will be specified with reference to the embodiments described below in detail together with the attached drawings. However, the present disclosure may have different forms and should not be construed as being limited to the descriptions set forth herein.

The embodiments of the present disclosure will be described below in more detail with reference to the accompanying drawings. Those elements that are the same or are in correspondence are rendered the same reference numeral regardless of the figure number, and redundant explanations are omitted.

It will be understood that although the terms "first", "second", etc. may be used herein to describe various elements, these elements should not be limited by these terms. These elements are only used to distinguish one element from another. Herein, singular expressions, unless defined otherwise in contexts, include plural expressions. In the embodiments below, it will be further understood that the terms "comprise" and/or "have" used herein specify the presence of stated features or elements, but do not preclude the presence or addition of one or more other features or elements. In the drawings, for convenience of description, sizes of elements may be exaggerated or contracted. In other words, since sizes and thicknesses of elements in the drawings are arbitrarily illustrated for convenience of explanation, the following embodiments are not limited thereto.

FIG. 1 is a schematic structural diagram of a weapon system, according to an embodiment.

When an image acquisition device included in the weapon system according to an embodiment has failed to track a first object which is a tracking target object, the weapon system may determine a reference object in an image and set an image capturing range and direction based on the reference object, and recognize the first object around the reference object again.

The weapon system according to the embodiment may include a control apparatus 100, an image acquisition device 200, and a firing device 300, as illustrated in FIG. 1.

When the image acquisition device 200 has failed to track the first object, which is a tracking target object, the control apparatus 100 according to an embodiment may determine a reference object in an image and set an image capturing range and direction of the image acquisition device 200 based on the reference object, and recognize the first object around the reference object again.

In addition, the control apparatus 100 according to the embodiment may control the firing device 300 based on tracking information about the first object, the tracking information being generated based on the image acquired using the image acquisition device 200. For example, the control apparatus 100 may control the firing device 300 to perform firing at the first object based on location information about the first object. However, this is an example, and the present disclosure is not limited thereto.

Figure 2:
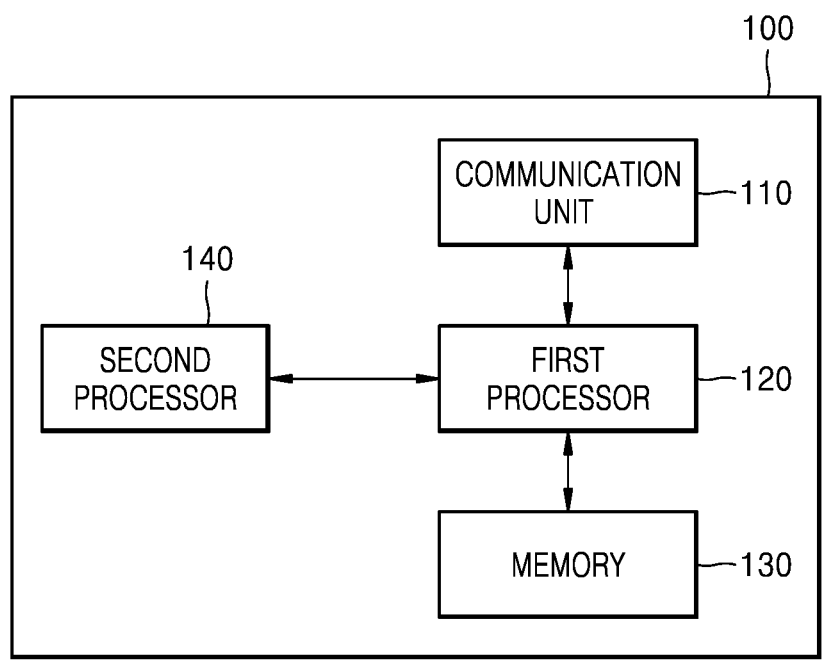
FIG. 2 is a schematic structural diagram of a control apparatus, according to an embodiment.

FIG. 2 is a schematic structural diagram of a control apparatus 100, according to an embodiment. Referring to FIG. 2, the control apparatus 100 according to an embodiment may include a communication interface 110, a first processor 120, a memory 130, and a second processor 140. Although not illustrated in the drawings, the control apparatus 100 may further include an input/output device, a program storage, or the like, according to an embodiment.

The communication interface 110 may include a device including hardware or software components required by the control apparatus 100 to transmit or receive a signal such as a control signal or a data signal through a wired/wireless connection with a tactical unit such as a moving vehicle (not shown), a vessel (not shown), an armored vehicle (not shown), and the like. The communication interface 110 may include at least one of a digital modem, a radio frequency (RF) modem, a WiFi chip, and related software and/or firmware.

The first processor 120 may perform tracking of the first object based on the image acquired by the image acquisition device 200. The first processor 120 may also control the image acquisition device 200 and/or the firing device 300 based on the tracking information about the first object. In this process, the first processor 120 may control a series of processes of confirming a location of the first object in the image by using a trained artificial neural network.

A processor herein may refer to, for example, a data processing device that is embedded in a hardware component and has a physically structured circuit to perform a function expressed as a code or a command included in a program. Examples of the data processing device embedded in a hardware component may encompass processing devices such as a microprocessor, a central processing unit (CPU), a processor core, a multiprocessor, an application-specific integrated circuit (ASIC), a field programmable gate array (FPGA), and the like, but the present disclosure is not limited thereto.

The memory 130 performs a function of temporarily or permanently storing data processed by the control apparatus 100. The memory may include a magnetic storage medium or a flash storage medium, but the scope of the present disclosure is not limited thereto. For example, the memory 130 may temporarily and/or permanently store an image acquired using the image acquisition device 200. Also, the memory 130 may temporarily and/or permanently store data (e.g., coefficients) constituting the trained artificial neural network. However, this is an example, and the present disclosure is not limited thereto.

The second processor 140 may refer to a device that performs an operation under the control by the above-described first processor 120. In this case, the second processor 140 may be a device having a higher arithmetic capability than the above-described first processor 120. For example, the second processor 140 may be configured as a graphics processing unit (GPU). However, this is an example, and the present disclosure is not limited thereto. In an embodiment, a plurality of second processors 140 or a single second processor 140 may be included. According to an embodiment, the second processor 140 may be included in or implemented as a sub-processor of the first processor 120.

According to an embodiment, the image acquisition device 200 may include various types of devices for acquiring an image of the surroundings according to the control by the control apparatus 100 described above. According to an embodiment, the image acquisition device 200 may be a device capable of performing panning, tilting or zooming such as a pan/tilt/zoom (PTZ) camera including one or more complementary metal oxide semiconductor (CMOS) image sensors. The first processor 120 and/or the second processor 140 may determine at least one of a pan value, a tilt value, and a zoom value of the image acquisition device 200 according to a moving direction and/or a location of the first object which is a tracking target object, and provide the same to the image acquisition device 200, and the image acquisition device 200 may acquire an appropriate image, accordingly. However, this is an example, and the present disclosure is not limited thereto.

While the image acquisition device 200 and the firing device 300 are illustrated as an integrated configuration In FIG. 1, the present disclosure is not limited thereto, and the image acquisition device 200 and the firing device 300 may be provided independently of each other.

The firing device 300 may include various types of devices for performing firing according to the control by the control apparatus 100 described above, according to an embodiment. For example, the firing device 300 may be a device that fires bullets and/or shells toward a target.

In an embodiment, the control apparatus 100 may generate location information about the first object based on the image acquired using the image acquisition device 200, and transfer the location information about the first object to the firing device 300, so that the firing device 300 may perform firing at the first object. However, this is an example, and the present disclosure is not limited thereto.

Hereinafter, description will focus on an operation of the control apparatus 100, according to an embodiment.

In the present disclosure, an "artificial neural network" may include a neural network trained with learning data according to uses, and may refer to an artificial neural network trained by a machine learning or deep learning technique. A structure of the above neural network will be described with reference to FIG. 3, and learning data of the artificial neural network will be described with reference to FIG. 4, and input data and output data of the artificial neural network will be described with reference to FIG. 5.

The control apparatus 100 may train an artificial neural network for recognizing a certain object in an image by using learning data, according to an embodiment.

Figure 3:
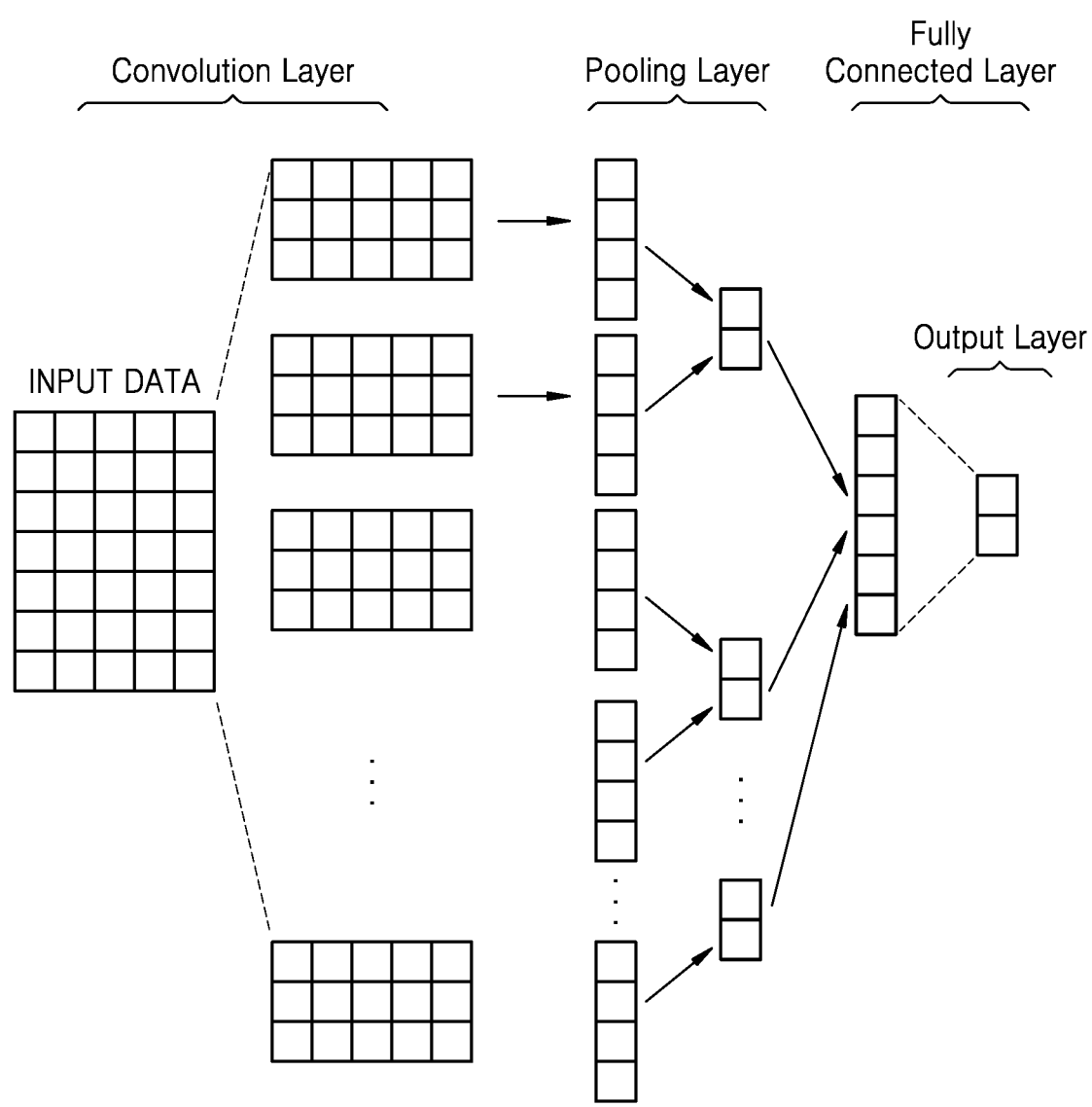
FIG. 3 is a diagram for describing an example structure of an artificial neural network trained by the control apparatus, according to an embodiment.

FIG. 3 is a diagram for describing an example structure of an artificial neural network trained by the control apparatus 100, according to an embodiment.

The artificial neural network may include an artificial neural network according to a convolutional neural network (CNN), as illustrated in FIG. 3, according to an embodiment. The CNN model may be a layer model used to alternately perform a plurality of computational layers (convolutional layer, pooling layer) to finally extract features of input data.

The control apparatus 100 may establish or train an artificial neural network model by processing learning data according to a supervised learning technique, according to an embodiment. A method, performed by the control apparatus 100, of training an artificial neural network will be described later with reference to FIG. 4.

According to an embodiment, the control apparatus 100 may train an artificial neural network, by using a plurality of learning data, by repeatedly performing an operation of updating a weight of each layer and/or each node such that an output value generated by inputting any one piece of input data into the artificial neural network is close to a value marked on the learning data.

The control apparatus 100 may update a weight (or coefficient) of each layer and/or each node according to a back propagation algorithm, according to an embodiment.

The control apparatus 100 may generate a convolution layer for extracting feature values of input data and a pooling layer for configuring a feature map by combining the extracted feature values, according to an embodiment.

In addition, the control apparatus 100 may generate, by combining the generated feature maps, a fully connected layer that prepares to determine a probability that input data corresponds to each of a plurality of items, according to an embodiment.

The control apparatus may generate an output layer including an output corresponding to input data, according to an embodiment.

In the example illustrated in FIG. 3, input data is divided into 5×7 blocks, a 5×3 unit block is used to generate a convolution layer, and a 1×4 or 1×2 unit block is used to generate a pooling layer. However, this is an example, and the present disclosure is not limited thereto. Accordingly, the type of input data and/or the size of each block may be variously configured.

The artificial neural network described above may be stored in the memory 130 described above in the form of coefficients of a function defining the type of the artificial neural network model, a coefficient of at least one node constituting the artificial neural network, a weight of the node, and a relationship between a plurality of layers constituting the artificial neural network. The structure of the artificial neural network may also be stored in the memory 130 in the form of source code and/or a program.

The types and/or structures of the artificial neural network described in FIG. 3 are examples, and the present disclosure is not limited thereto. Therefore, artificial neural networks of various types of models may correspond to the "artificial neural networks" described throughout the specification.

Figure 4:
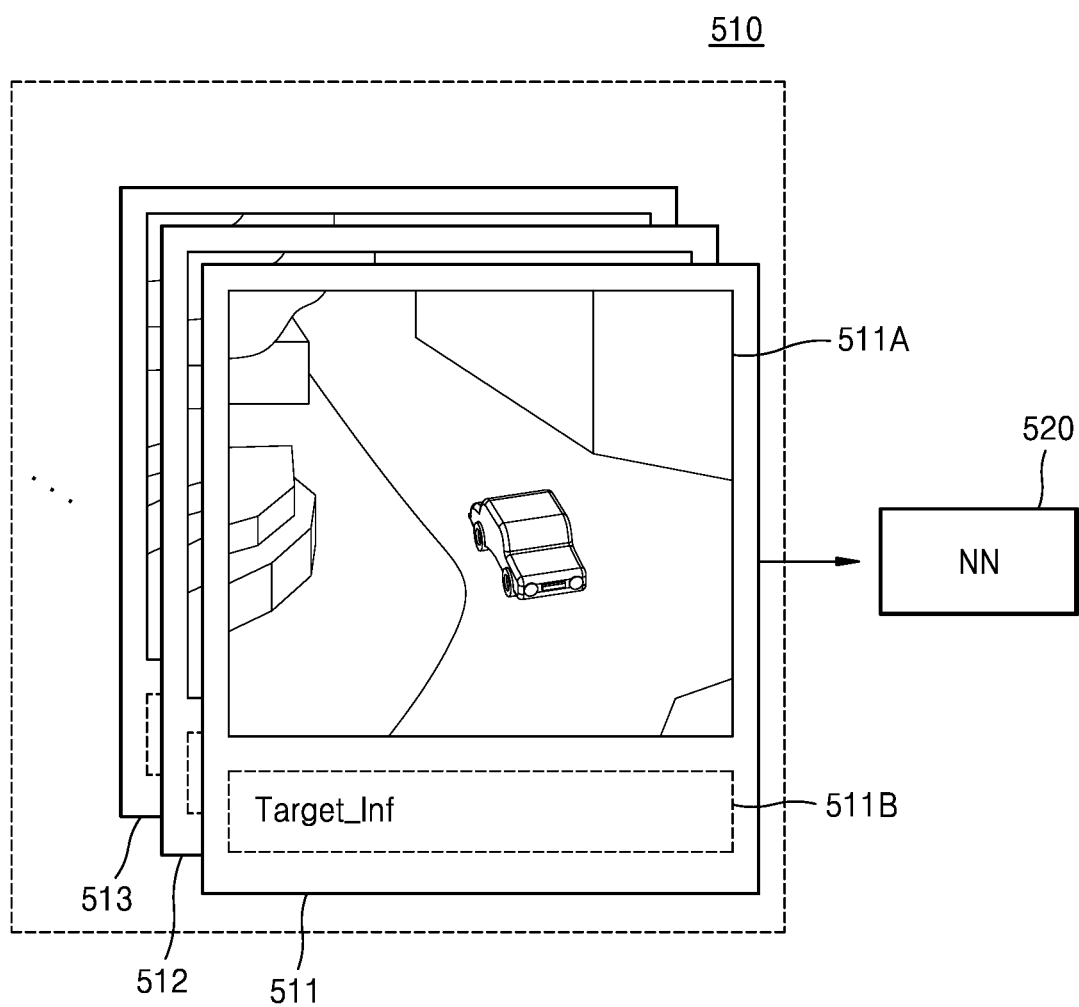
FIG. 4 is a diagram for describing a method of training an artificial neural network by using a plurality of learning data, according to an embodiment.
Figure 5:
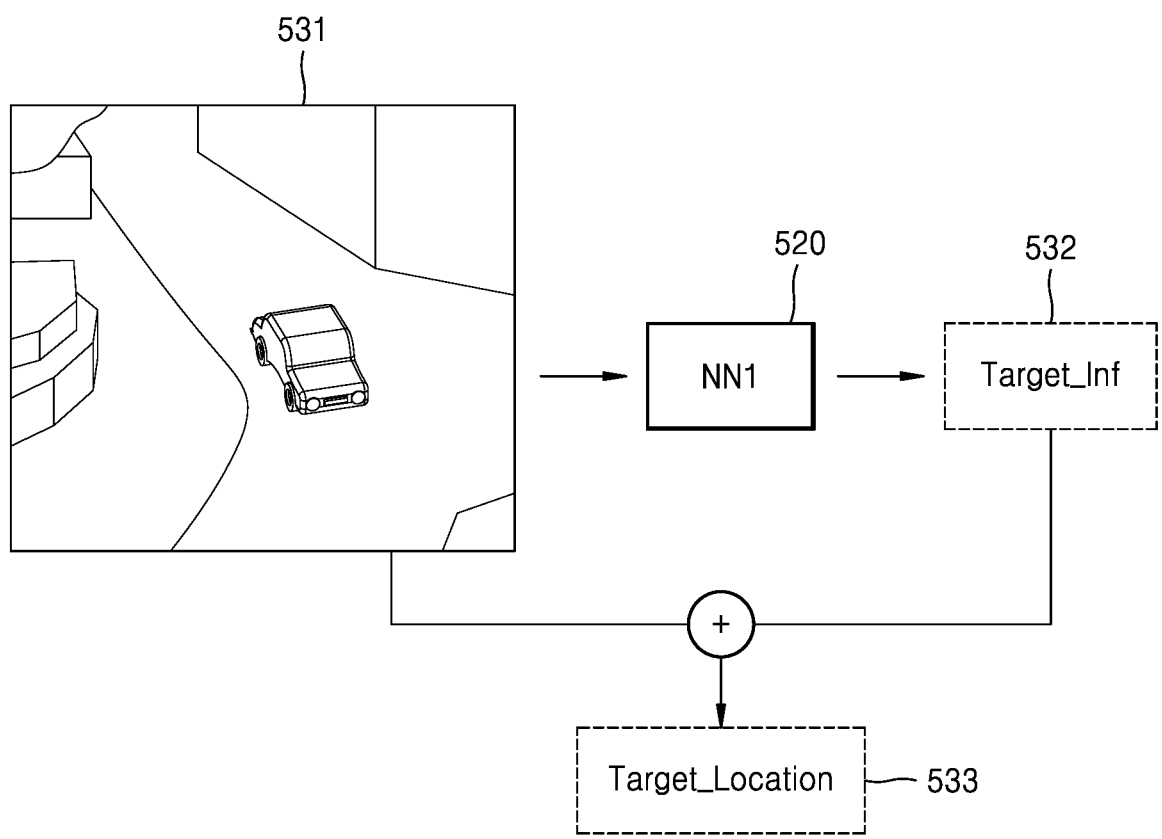
FIG. 5 is a diagram for describing a process of outputting location information about an object by using a trained artificial neural network, according to an embodiment.

FIG. 4 is a diagram for describing a method of training an artificial neural network by using a plurality of learning data. FIG. 5 is a diagram for describing a process of outputting location information about an object by using a trained artificial neural network, according to an embodiment.

Referring to FIGS. 4 and 5, an artificial neural network 520 may refer to a neural network that is trained (or learns) a correlation between images included in each of a plurality of training data 510 and information about objects in the images, according to an embodiment.

Accordingly, the artificial neural network 520 may be a neural network trained to output information 532 about an object included in an image 531 according to input of the image 531 as illustrated in FIG. 5. The information 532 about the object may include information for recognizing the object in the image 531 (e.g., information about the shape of the object, information about the class of the object, etc.).

Each of the plurality of learning data 510 according to the embodiment may include an image including an object and information about the object included in that image. For example, first training data 511 may include an image 511A including an object and information 511B about the object in the image 511A. For example, when an object is a car, the image 511A may include a car as illustrated, and the information 511B about the object may include information about the shape of the car. According to another embodiment, the information 511B about the object may further include information about the class (or type) of the object.

Similarly, second training data 512 and third training data 513 may also include an image including an object and information about the object included in the image, respectively. Here, the image 511A of the first training data 511, the image of the second training data 512 and the image of the third training data 513 may form a video or a video clip captured by the same image acquisition device 200.

Hereinafter, it will be described on the basis of the assumption that learning of the artificial neural network has been completed according to the above-described process.

The control apparatus 100 may identify a location of an object in an image including the object by referring to the image including the object and information about the object included in the image, according to an embodiment.

In addition, the control apparatus 100 may obtain a location of an object in an actual space of the object based on a pan value, a tilt value, and a zoom value at a time when the image acquisition device 200 acquires an image including the object and a location of the object in the image, according to an embodiment.

The control apparatus 100 according to the embodiment may track the first object, which is the tracking target object, based on the image acquired by the image acquisition device 200. In this case, "tracking" the first object may indicate determining a location of the first object that is changed according to a movement of the first object in real time, and controlling the image acquisition device 200 and/or the firing device 300 accordingly, according to an embodiment.

The control apparatus 100 may track the first object by using the artificial neural network 520 trained according to the process described with reference to FIGS. 4 and 5. For example, the control apparatus 100 may input an image such as the image 511A acquired by the image acquisition device 200 to the artificial neural network 520 to generate object information for the image.

In addition, as described above, the control apparatus 100 may determine the location of the object in the acquired image by referring to the image acquired by the image acquisition device 200 and the information about the object generated by the artificial neural network 520, as described above. The control apparatus 100 may also obtain a location of an object in an actual space based on a pan value, a tilt value, and a zoom value at a time when the image acquisition device 200 acquires an image and the location of the object in the image.

However, the object tracking method using the artificial neural network trained as described above is an example, and the present disclosure is not limited thereto, and various object tracking methods may be used without limitation to the extent that the methods are consistent with the present disclosure.

According to an embodiment, the control apparatus 100 may track the first object by using information on the first object, the information being collected in the process of tracking the first object, in addition to the information about the object, generated by the artificial neural network 520 described above. For example, the control apparatus 100 may track the first object by using class information about the first object, color information about the first object, movement pattern information about the first object, and the like. However, this is an example, and the present disclosure is not limited thereto.

According to an embodiment, the control apparatus 100 may detect an event in which tracking of the first object has failed, from a first image acquired by the image acquisition device 200. For example, when the first object is obscured by another object and disappears from the first image, the control apparatus 100 may determine that an event in which tracking of the first object has failed is detected. Also, even when the first object, which the control apparatus 100 was tracking, is covered up, the control apparatus 100 may determine that an event in which tracking of the first object has failed is detected. However, the above-described conditions of a tracking failure are examples, and the present disclosure is not limited thereto.

According to an embodiment, the control apparatus 100 may determine a reference object which is a reference for controlling the image acquisition device 200 in the first image according to the detection of the above-described event. The determined reference object may be a reference object for determining an image capturing range and an image capturing direction of the image acquisition device 200.

Figure 6:
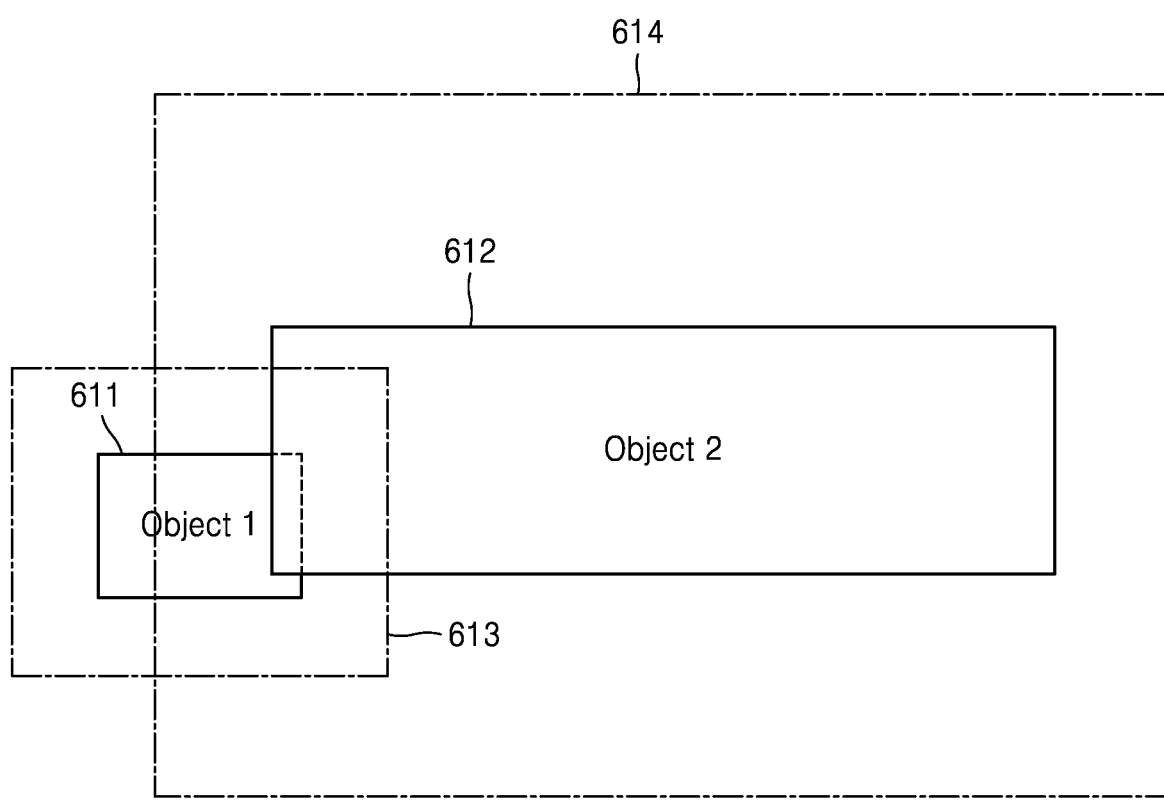
FIGS. 6 and 7 are diagrams for describing a process, performed by a control apparatus, of determining a reference object, according to embodiments.
Figure 7:
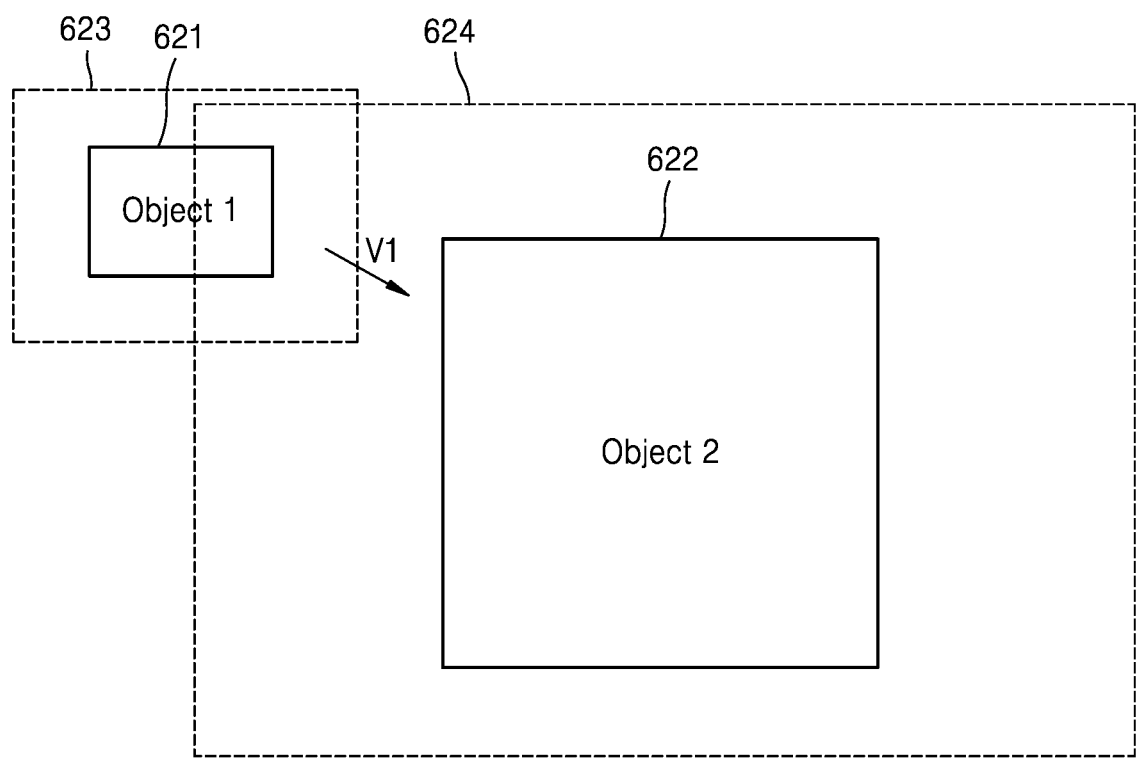

FIGS. 6 and 7 are diagrams for describing a process, performed by a control apparatus, according to an embodiment, of determining a reference object.

As illustrated in FIG. 6, when at least a portion of a first object 611 is obscured by a second object 612 that is different from the first object 611, the control apparatus 100 may set the second object 612 covering the first object 611, as a reference object, according to an embodiment.

Meanwhile, as illustrated in FIG. 7, the control apparatus 100 may determine, as a reference object, a second object 622 among objects placed in a moving direction V1 of a first object 621, according to an embodiment. The control apparatus 100 may determine the moving direction V1 of the first object 621 based on at least one image acquired by the image acquisition device 200 earlier than a first image.

The control apparatus 100 may adjust at least one of an image capturing range and an image capturing direction of the image acquisition device 200 based on at least one of a size and a location of the reference object determined in the above-described process, in the first image, according to an embodiment.

To this end, the control apparatus 100 may determine a region corresponding to the reference object in the first image, according to an embodiment. For example, the control apparatus 100 may determine a region occupied by the reference object in the first image as the region corresponding to the reference object.

Then, the control apparatus 100 may adjust at least one of the image capturing range and the image capturing direction based on a relative locational relationship between the region corresponding to the reference object and a boundary line of the first image. The "boundary line" of the first image may refer to an outermost portion of the first image, that is, a line dividing the first image from the other portion in the first image.

For example, when the region corresponding to the reference object abuts the boundary line of the first image, the control apparatus 100 may adjust an image capturing range and an image capturing direction of the image acquisition device 200 such that the image capturing range of the image acquisition device 200 is extended and the reference object is positioned in a center portion of a second image.

When the region corresponding to the reference object does not abut the boundary line of the first image, the control apparatus 100 may adjust the image capturing direction, but not the image capturing range, such that the reference object is positioned in the center portion of the second image.

Figure 8:
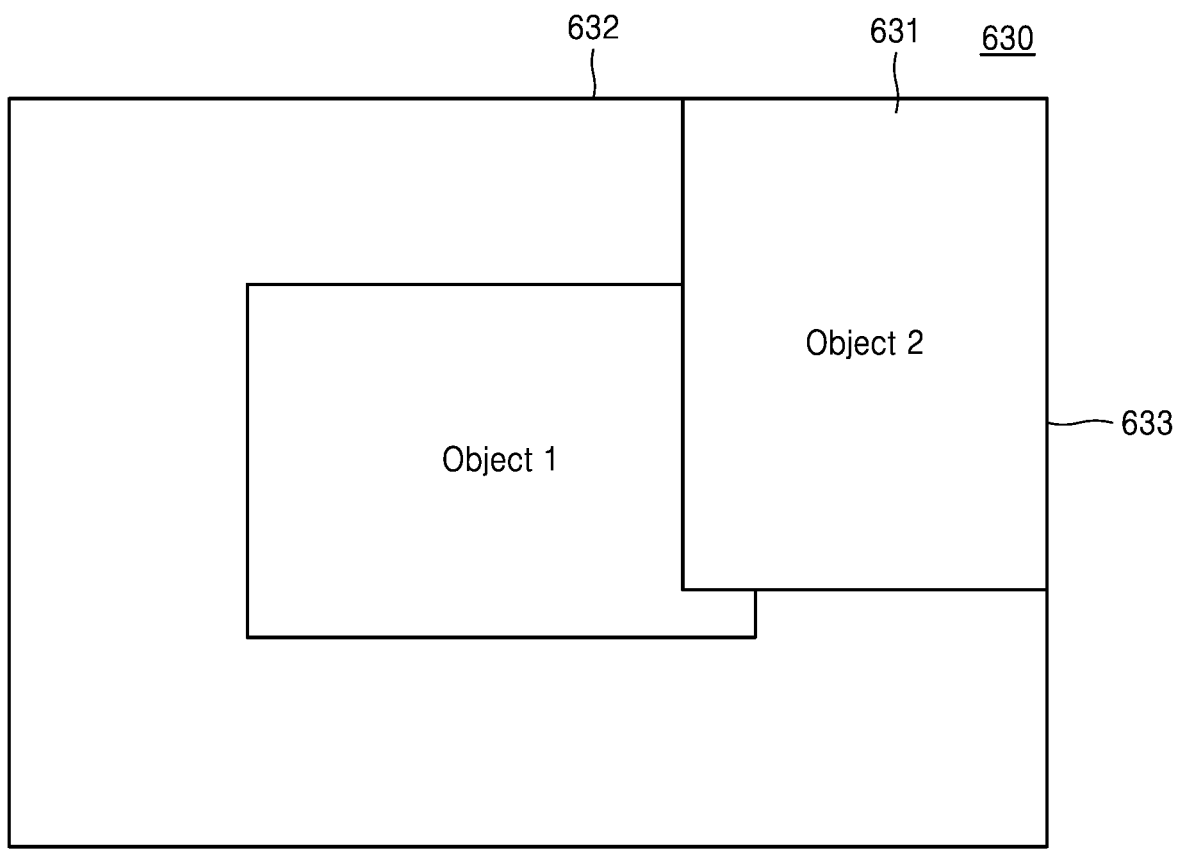
FIG. 8 illustrates an example of a first image acquired in a situation illustrated in FIG. 6.

FIG. 8 illustrates an example of a first image 630 acquired in a situation illustrated in FIG. 6. Hereinafter, embodiments will be described with reference to FIGS. 6 through 8 together.

When normal tracking of the first object 611 or 621 is performed using the control apparatus 100, the image capturing range of the image acquisition device 200 may be a range 613 illustrated in FIG. 6 or a range 623 illustrated in FIG. 7. Accordingly, in the embodiment of FIG. 6, the image acquisition device 200 may acquire the first image 630 illustrated in FIG. 8.

When the control apparatus 100 detects an event in which tracking of the first objects 611 and 621 is failed, the control apparatus 100 may modify the image capturing range and the image capturing direction to a range 614 illustrated in FIG. 6 or a range 624 illustrated in FIG. 7. The ranges 614 and 624 may include the reference object at a center thereof.

Referring to FIG. 8, when a region 631 corresponding to the reference object and boundary lines 632 and 633 of the first image abut on each other, the control apparatus 100 according to an embodiment may adjust the image capturing range and image capturing direction of the image acquisition device 200 such that the image capturing range of the image acquisition device 200 is extended and the reference object is located in a center of the second image. The control apparatus 100 may change the image capturing range and the image capturing direction to correspond to the range 614 illustrated in FIG. 6 as described above.

When changing the image capturing range and the image capturing direction, the control apparatus 100 may adjust the image capturing range such that a ratio of a region corresponding to the reference object in the second image exceeds a certain first threshold ratio and is less than a certain second threshold ratio. The "second image" may refer to an image acquired by the image acquisition device 200 in a state in which at least one of the image capturing range and the image capturing direction is adjusted.

The control apparatus 100 may recognize, in the second image, the first object which is a tracking target object, according to an embodiment.

Figure 9:
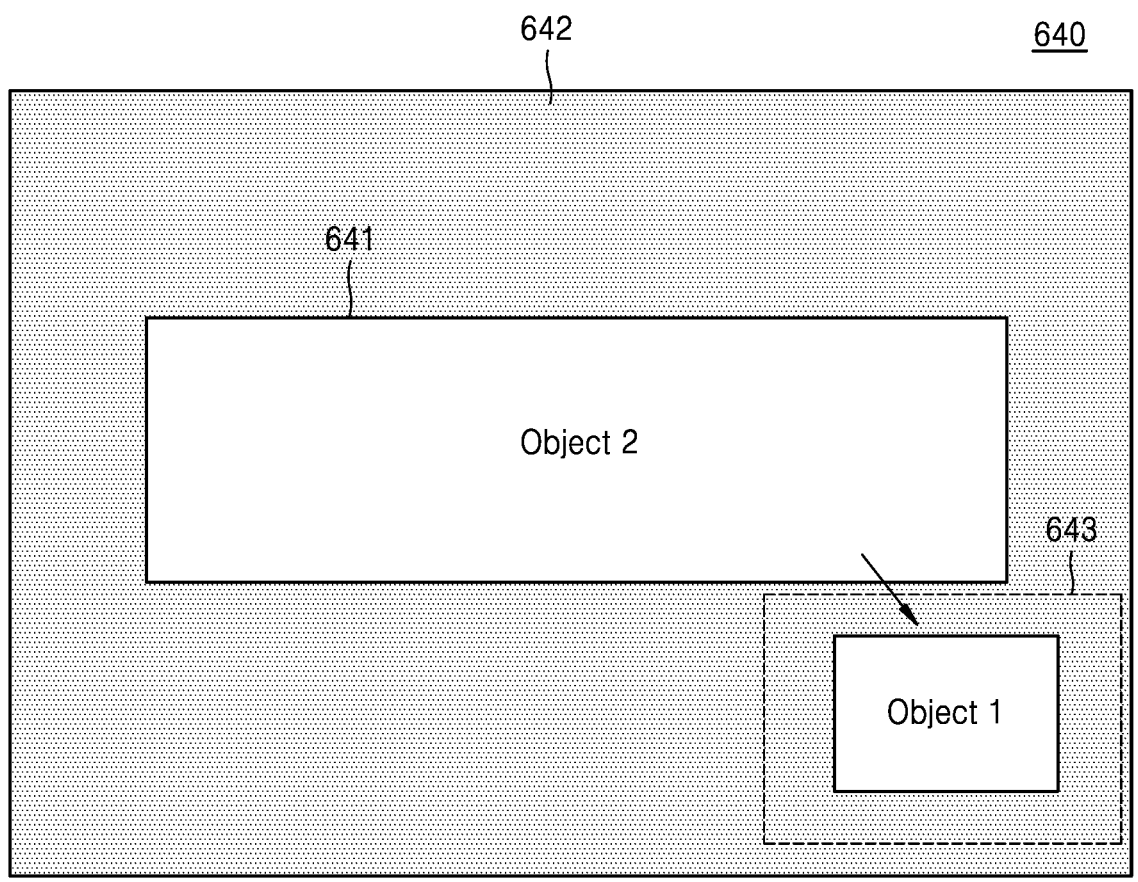
FIG. 9 is a diagram for describing a process, performed by a control apparatus, of recognizing a first object from a second image, according to an embodiment.

FIG. 9 is a diagram for describing a process, performed by a control apparatus 100, of recognizing a first object from a second image, according to an embodiment.

The control apparatus 100 may maintain the image capturing range and the image capturing direction of the image acquisition device 200 until the first object is recognized (or recognized again) in the second image 640, according to an embodiment.

Also, the control apparatus 100 may set at least a partial region of the second image 640 as a region of interest in which the first object is expected to appear, according to an embodiment. For example, the control apparatus 100 may set a region 642 of the second image 640 other than the region 641 corresponding to the second object as a region of interest.

The control apparatus 100 may recognize the first object in the region of interest 642 by using a trained artificial neural network. The trained artificial neural network may include a neural network trained to output information about an object included in an image according to the input of the image as described above.

According to an embodiment, the control apparatus 100 may recognize the first object in the region of interest 642 by using collected information on the first object together with the artificial neural network. For example, the control apparatus 100 may also recognize (or detect) the first object by comparing class information about the first object, color information about the first object, and movement pattern information about the first object, etc., which are collected with respect to a plurality of objects existing in the region of interest 642. The control apparatus 100 may use an artificial neural network as an aid. For example, the control apparatus 100 may generate information (e.g., class information) about objects in the region of interest 642 by using an artificial neural network. However, this is an example, and the present disclosure is not limited thereto.

When the first object is recognized in the second image 640 according to the above-described process, the control apparatus 100 may initiate tracking of the first object by referring to a location of the first object in the second image 640, according to an embodiment. Thus, the control apparatus 100 may change the image capturing range and the image capturing direction of the image acquisition device 200 again to correspond to a range 643 illustrated in FIG. 9. The control apparatus 100 may also change the image capturing range and direction of the image acquisition device 200 in real time according to a movement of the first object.

As described above, according to the present disclosure, re-tracking and accurate tracking of an object may be performed by controlling the image capturing range and the image capturing direction of the image acquisition device 200 according to situations.

Figure 10:
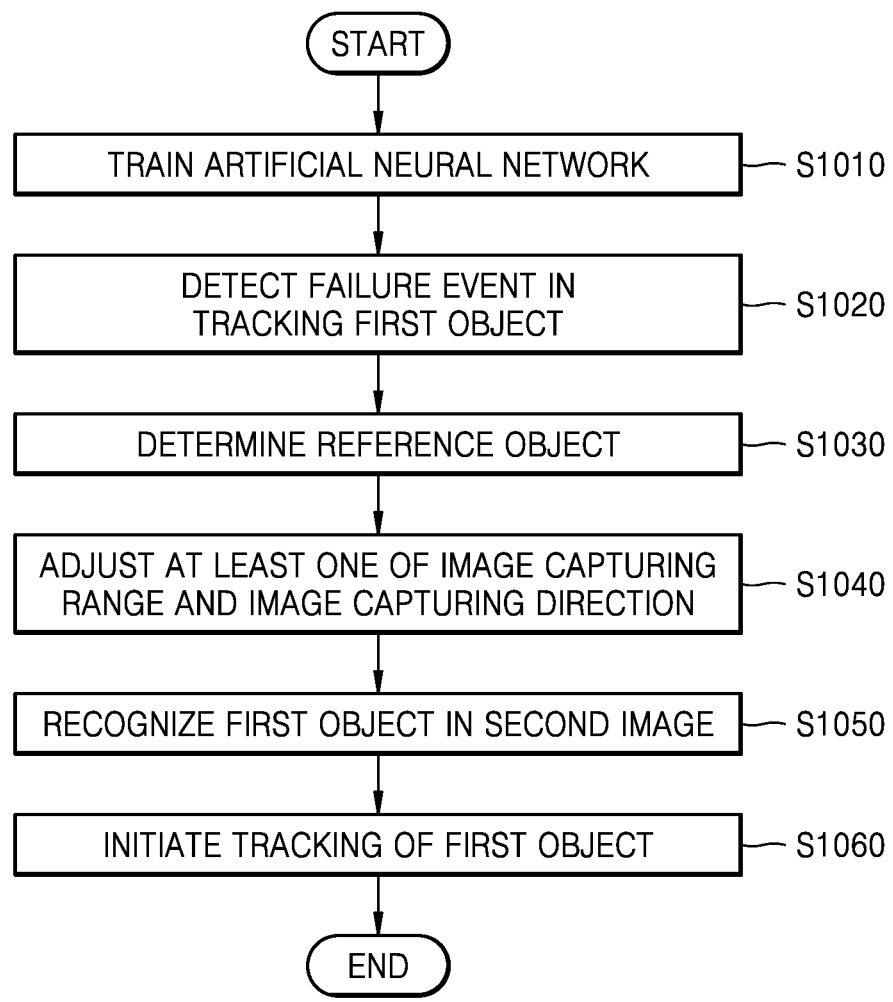
FIG. 10 is a flowchart of a method, performed by a control apparatus, of controlling the image acquisition device, according to an embodiment.

FIG. 10 is a flowchart of a method, performed by the control apparatus 100, of controlling the image acquisition device 200, according to an embodiment. Hereinafter, embodiments will be described with reference to FIGS. 1 through 9 together, and description of repeated details will be omitted.

The control apparatus 100 may train an artificial neural network for recognizing a first object in an image by using learning data (S1010). The artificial neural network may include an artificial neural network according to a convolutional neural network (CNN), as illustrated in FIG. 3.

The control apparatus 100 may detect an event in which tracking of the first object has failed, from a first image acquired by the image acquisition device 200, according to an embodiment (S1020), For example, when the first object is obscured by another object and disappears from the first image, the control apparatus 100 may determine that an event in which tracking of the first object has failed is detected. Also, even when the first object, which the control apparatus 100 was tracking, is covered up, the control apparatus 100 may determine that an event in which tracking of the first object has failed is detected.

The control apparatus 100 may determine a reference object which is a reference for controlling the image acquisition device 200 in the first image according to the detection of the above-described event, according to an embodiment (S1030). The determined reference object may be a reference object for determining an image capturing range and an image capturing direction of the image acquisition device 200. The control apparatus 100 may adjust at least one of an image capturing range and an image capturing direction of the image acquisition device 200 based on at least one of a size and a location of the reference object determined in the above-described process, in the first image, according to an embodiment (S1040).

To this end, the control apparatus 100 may determine a region corresponding to the reference object in the first image. For example, the control apparatus 100 may determine a region occupied by the reference object in the first image as the region corresponding to the reference object.

Then, the control apparatus 100 may adjust at least one of the image capturing range and the image capturing direction based on a relative locational relationship between the region corresponding to the reference object and a boundary line of the first image.

For example, when the region corresponding to the reference object abuts the boundary line of the first image, the control apparatus 100 may adjust an image capturing range and an image capturing direction of the image acquisition device 200 such that the image capturing range of the image acquisition device 200 is extended and the reference object is positioned in a center portion of a second image.

When the region corresponding to the reference object does not abut the boundary line of the first image, the control apparatus 100 according to an embodiment may adjust only the image capturing direction such that the reference object is positioned in the center portion of the second image.

The control apparatus 100 may recognize, in the second image, the first object which is a tracking target object, according to an embodiment (S1050). The control apparatus 100 may maintain the image capturing range and the image capturing direction of the image acquisition device 200 until the first object is recognized (or recognized again) in the second image 640.

Also, the control apparatus 100 may set at least a partial region of the second image 640 as a region of interest in which the first object is expected to appear. For example, the control apparatus 100 may set a region 642 of the second image 640 other than the region 641 corresponding to the second object as a region of interest.

The control apparatus may recognize the first object in the region of interest 642 by using a trained artificial neural network.

When the first object is recognized in the second image 640 according to the above-described process, the control apparatus 100 may initiate tracking of the first object by referring to a location of the first object in the second image 640, according to an embodiment (S1060). Thus, the control apparatus 100 may change the image capturing range and the image capturing direction of the image acquisition device 200 again to correspond to a range 643 illustrated in FIG. 9.

As described above, according to the present disclosure, re-tracking and accurate tracking of an object may be performed by controlling the image capturing range and the image capturing direction of the image acquisition device 200 according to situations.

The above-described embodiments according to the present disclosure may be implemented in the form of a computer program that can be executed through various components on a computer, and such a computer program may be recorded in a computer-readable medium. In this case, the medium may be for storing a program executable by a computer. Examples of the medium include a hard disk, a magnetic medium such as a floppy disk and a magnetic tape, an optical recording medium such as CD-ROM and DVD, a magneto-optical medium such as a floppy disk, and those configured to store program instructions, including ROM, RAM, flash memory, and the like.

The computer program may be specifically designed and configured for the present disclosure or may be known and used by those skilled in the art of computer software. Examples of the computer program may include not only machine code generated by a compiler, but also advanced language code that can be executed by a computer using an interpreter or the like.

The specific implementations described in the present disclosure are only examples, and do not limit the scope in any way. For brevity of the specification, descriptions of conventional electronic components, control systems, software, and other functional aspects of the systems may be omitted. Furthermore, the connecting lines, or connectors between the components illustrated in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice unless the element is specifically described as "essential" or "critical."

According to the present disclosure, a tracking target object may be tracked again by appropriately controlling an image acquisition device in a situation of a failure in tracking the tracking target object.

In particular, according to the present disclosure, in a situation of a failure in tracking a tracking target object, by adjusting at least one of an image capturing direction and an image capturing range of the image acquisition device based on a reference object as a reference, an image including an object with a high probability to appear again may be acquired, and the furthermore, the tracking target object may be detected again.

In addition, according to the present disclosure, the tracking target object may be accurately tracked, thereby enabling an weapon system to accurately fire at the tracking target object.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of controlling an image acquisition device for tracking a target object, the method comprising:
   detecting an event in which tracking of a first object, which is a tracking target object, fails in a first image acquired by the image acquisition device;
   determining, in the first image, a reference object which is used as a reference for controlling the image acquisition device;
   controlling the image acquisition device such that at least one of an image capturing range and an image capturing direction of the image acquisition device is adjusted based on at least one of a size and a location of the reference object in the first image; and
   recognizing the first object in a second image acquired by the image acquisition device in a state in which at least one of the image capturing range and the image capturing direction is adjusted.

2. The method of claim 1, wherein the determining the reference object comprises setting a second object as the reference object when at least a portion of the first object is obscured by the second object, which is different from the first object, in the first image.

3. The method of claim 1, wherein the determining the reference object comprises:
   determining a moving direction of the first image based on at least one image acquired by the image acquisition device earlier than the first image; and
   determining, as the reference object, an object positioned in the determined moving direction in the first image.

4. The method of claim 1, wherein the controlling the image acquisition device comprises:
   determining a region corresponding to the reference object in the first image; and
   adjusting at least one of the image capturing range and the image capturing direction of the image acquisition device based on a relative locational relationship between the region corresponding to the reference object and a boundary line of the first image.

5. The method of claim 4, wherein the controlling the image acquisition device comprises, based on the region corresponding to the reference object abutting the boundary line of the first image, adjusting the image capturing range and the image capturing direction of the image acquisition device such that the image capturing range of the image acquisition device is extended and the reference object is positioned in a center portion of the second image.

6. The method of claim 4, wherein the controlling the image acquisition device comprises, based on the region corresponding to the reference object not abutting the boundary line of the first image, adjusting the image capturing direction such that the reference object is positioned in a center portion of the second image.

7. The method of claim 4, wherein the controlling the image acquisition device comprises adjusting the image capturing range of the image acquisition device such that a ratio of the region corresponding to the reference object in the second image exceeds a certain first threshold ratio and is less than a certain second threshold ratio.

8. The method of claim 1, wherein the recognizing the first object in the second image comprises:
   maintaining the image capturing range and the image capturing direction of the image acquisition device until the first object is recognized in the second image;
   setting at least a partial region of the second image as a region of interest in which the first object is expected to appear; and
   recognizing the first object in the region of interest by using a trained artificial neural network.

9. The method of claim 1, further comprising, after the recognizing the first object in the second image, initiating tracking of the first object by referring to a location of the first object in the second image.

10. A computer program recorded on a recording medium to execute the method of claim 1 by using a computer.

11. A control apparatus for controlling an image acquisition device for tracking a target object, the control apparatus comprising at least one processor configured to:
    detect an event in which tracking of a first object, which is a tracking target object, fails in a first image acquired by the image acquisition device;
    determine, in the first image, a reference object which is used as a reference for controlling the image acquisition device;

control the image acquisition device such that at least one of an image capturing range and an image capturing direction of the image acquisition device is adjusted based on at least one of a size and a location of the reference object in the first image; and recognize the first object in a second image acquired by the image acquisition device in a state in which at least one of the image capturing range and the image capturing direction is adjusted.

12. The control apparatus of claim 11, wherein the processor is further configured to set a second object as the reference object when at least a portion of the first object is obscured by the second object, which is different from the first object, in the first image.

13. The control apparatus of claim 11, wherein the processor is further configured to:
determine a moving direction of the first image based on at least one image acquired by the image acquisition device earlier than the first image; and
determine, as the reference object, an object positioned in the determined moving direction in the first image.

14. The control apparatus of claim 11, wherein the processor is further configured to:
determine a region corresponding to the reference object in the first image; and
adjust at least one of the image capturing range and the image capturing direction of the image acquisition device based on a relative locational relationship between the region corresponding to the reference object and a boundary line of the first image.

15. The control apparatus of claim 14, wherein based on the region corresponding to the reference object abutting the boundary line of the first image, the processor is further configured to adjust the image capturing range and the image capturing direction of the image acquisition device such that the image capturing range of the image acquisition device is extended and the reference object is positioned in a center portion of the second image.

16. The control apparatus of claim 14, wherein based on the region corresponding to the reference object not abutting the boundary line of the first image, the processor is further configured to adjust the image capturing direction such that the reference object is positioned in a center portion of the second image.

17. The control apparatus of claim 14, wherein the processor is further configured to adjust the image capturing range of the image acquisition device such that a ratio of the region corresponding to the reference object in the second image exceeds a certain first threshold ratio and is less than a certain second threshold ratio.

18. The control apparatus of claim 11, wherein the processor is further configured to maintain the image capturing range and the image capturing direction of the image acquisition device until the first object is recognized in the second image;
set at least a partial region of the second image as a region of interest in which the first object is expected to appear; and
recognize the first object in the region of interest by using a trained artificial neural network.

19. The control apparatus of claim 11, wherein the processor is further configured to initiate tracking of the first object by referring to a location of the first object in the second image.

20. A weapon system comprising:
the control apparatus of claim 19;
the image acquisition device; and
a firing device configured to fire at the first object based on the location of the first object in the second image.

* * * * *